United States Patent [19]

Mills

[11] Patent Number: 5,203,151
[45] Date of Patent: Apr. 20, 1993

[54] GRASS CUTTING UNIT WITH HEIGHT OF CUT ADJUSTMENT

[75] Inventor: John Mills, Suffolk, England

[73] Assignee: Ransomes Sims & Jefferies Limited, Ipswich, England

[21] Appl. No.: 838,270
[22] PCT Filed: Jul. 31, 1990
[86] PCT No.: PCT/GB90/01185
  § 371 Date: May 13, 1992
  § 102(e) Date: May 13, 1992
[87] PCT Pub. No.: WO91/03927
  PCT Pub. Date: Apr. 4, 1991

[30] Foreign Application Priority Data

Sep. 15, 1989 [GB] United Kingdom ............... 8920953

[51] Int. Cl.$^5$ ............................................. A01D 34/54
[52] U.S. Cl. ........................................ 56/17.2; 56/249; 172/427; 280/43.2
[58] Field of Search ................... 56/17.1, 17.2, 249, 56/252, 294; 280/43.2; 172/427

[56] References Cited

U.S. PATENT DOCUMENTS 1,852,100 4/1932 Ballou ............................. 280/43.2 X
3,099,124 7/1963 Strasel ............................. 56/17.2 X

FOREIGN PATENT DOCUMENTS 2222933 10/1974 France .
443506 3/1936 United Kingdom .
516932 6/1939 United Kingdom .

Primary Examiner—David J. Bagnell

[57] ABSTRACT

A grass cutting unit has a height of cut determined by a ground roll. A reaction member linked to the ground roll has a captive screw-threaded shaft carrying a hand wheel. A block threaded onto the shaft is linked to the frame of the cutting unit so that rotation of the hand wheel adjusts the height of cut. The weight of the frame is arranged to act on the hand wheel, to urge together contoured surfaces of the hand wheel and the reaction member so as, during normal cutting, to prevent spurious rotation of the hand wheel.

10 Claims, 4 Drawing Sheets

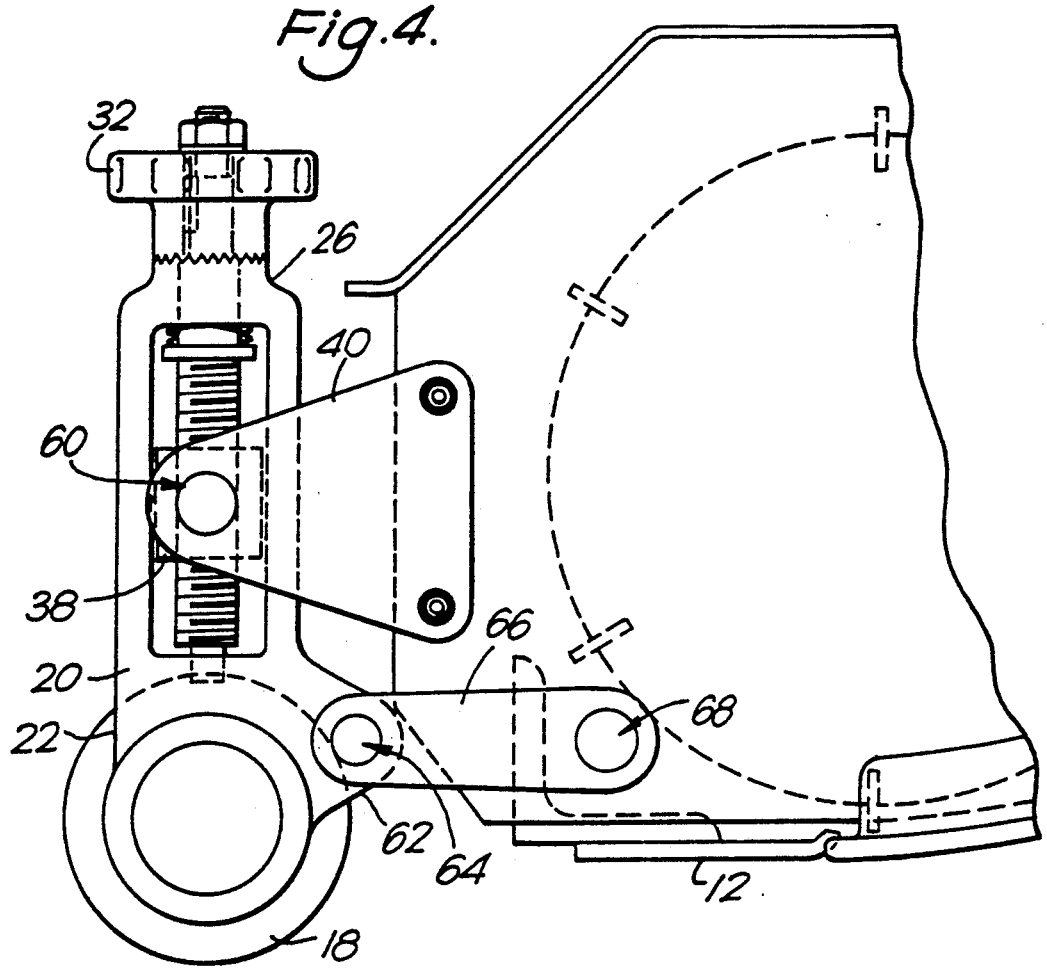
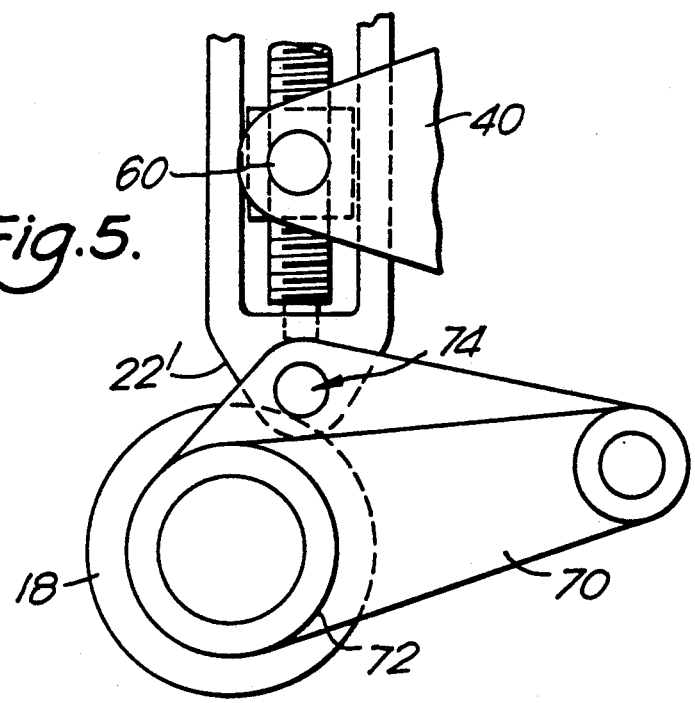

GRASS CUTTING UNIT WITH HEIGHT OF CUT ADJUSTMENT

This invention relates to grass cutting units provided with height of cut adjustment. More particularly, the invention concerns a grass cutting unit of a type having a cutting reel rotatably mounted in a frame with the frame being supported by a ground engaging roll to give the correct height of cut.

In a typical construction, a height of cut adjuster is provided at each end of the ground roll, the adjuster including a hand wheel which is rotated about a vertical screw axis to adjust the height of cut. During this adjustment, care is of course taken to maintain parallelism between the axis of the ground roll and the cutting line of the unit. There is, however, the problem that vertical loading on the threaded hand wheel tends to cause spurious rotation and it is usually necessary to provide a locking device to ensure that the height of cut does not vary and that parallelism is maintained during cutting.

The locking device often complicates the operation of adjusting the height of cut and, to the extent that additional components are required, will increase manufacturing costs. Space will of course need to be provided for any additional components and this may interfere with the overall design of the grass cutting machine of which the unit forms part. It will be recognised, for example, that where a number of cutting units are provided on one machine, it is desirable to have cutting units closely associated fore and aft to avoid uncut areas when the machine turns, without the necessity of large overlaps between cutting units.

It is an object of this invention to provide a grass cutting unit with height of cut adjustment in which the above difficulties are reduced or overcome.

Accordingly, the present invention consists in a grass cutting comprising a frame; a cutting reel rotatably mounted in the frame to define therewith a horizontal cutting line; a ground roll and roll support means connected between the roll and the frame and serving, with the roll in ground engagement, to support the frame with the cutting line at a desired cutting height above ground, wherein the roll support means comprises first and second screw-thread inter-engaging adjustment members operatively connected with the ground roll and the frame respectively, such that relative rotation of said adjustment members about a screw-thread axis thereof serves to adjust the cutting height, characterised in that there is provided a reaction member having a surface adapted for interlocking engagement with a surface of the first adjustment member to inhibit said relative rotation of the adjustment members and in that, to permit said adjustment of the cutting height, the first adjustment member is moveable away from the reaction member against the action of at least a substantial proportion of the weight of the frame and the cutting reel.

The invention will now be described by way of example with reference to the accompanying drawings in which:

FIG. 4 is a view similar to FIG. 1 illustrating a modification; and

FIGS. 5 and 6 are a part views illustrating respective further modifications.

Figure 1:
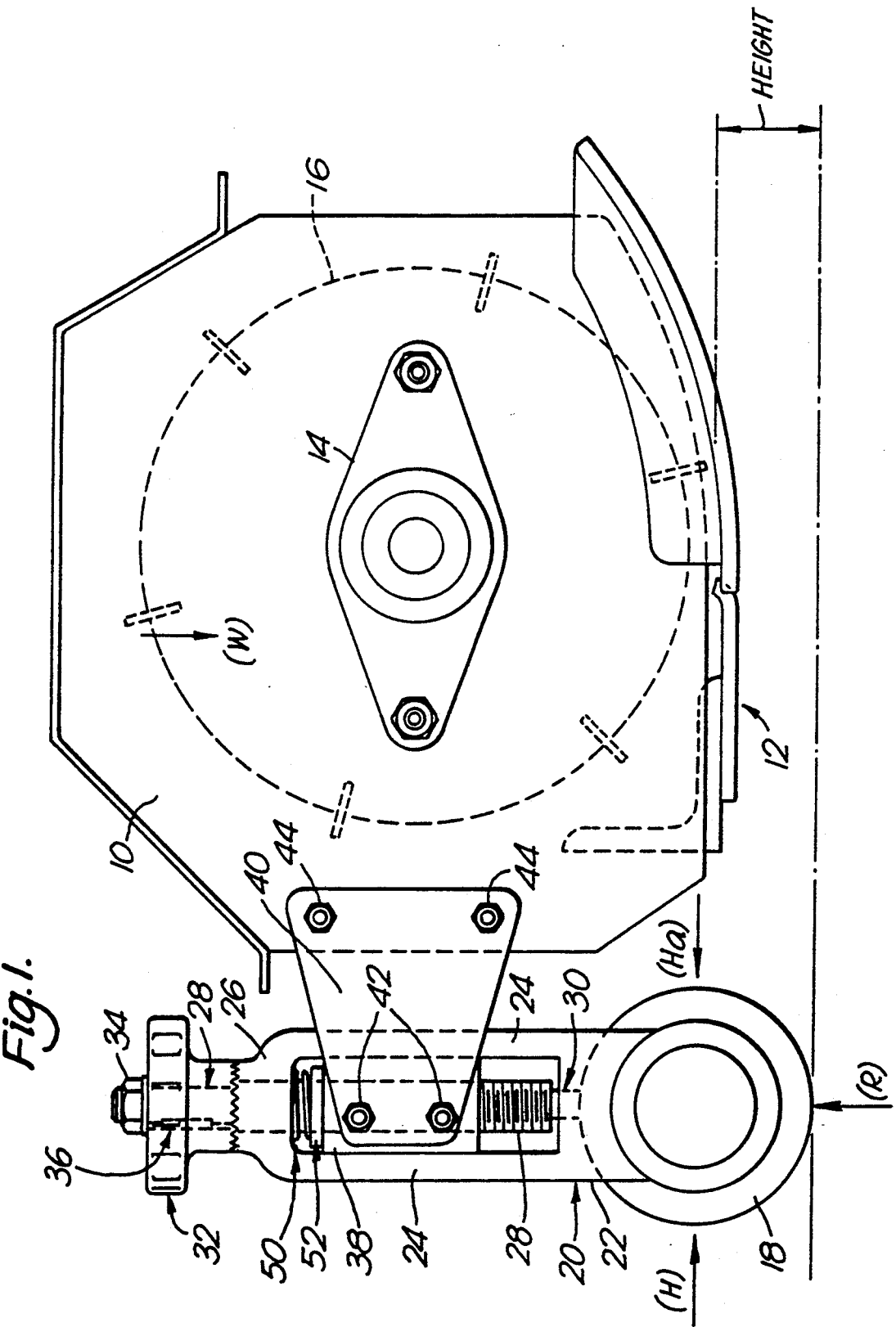
FIG. 1 is an end view of a grass cutting unit according to this invention.
Figure 2:
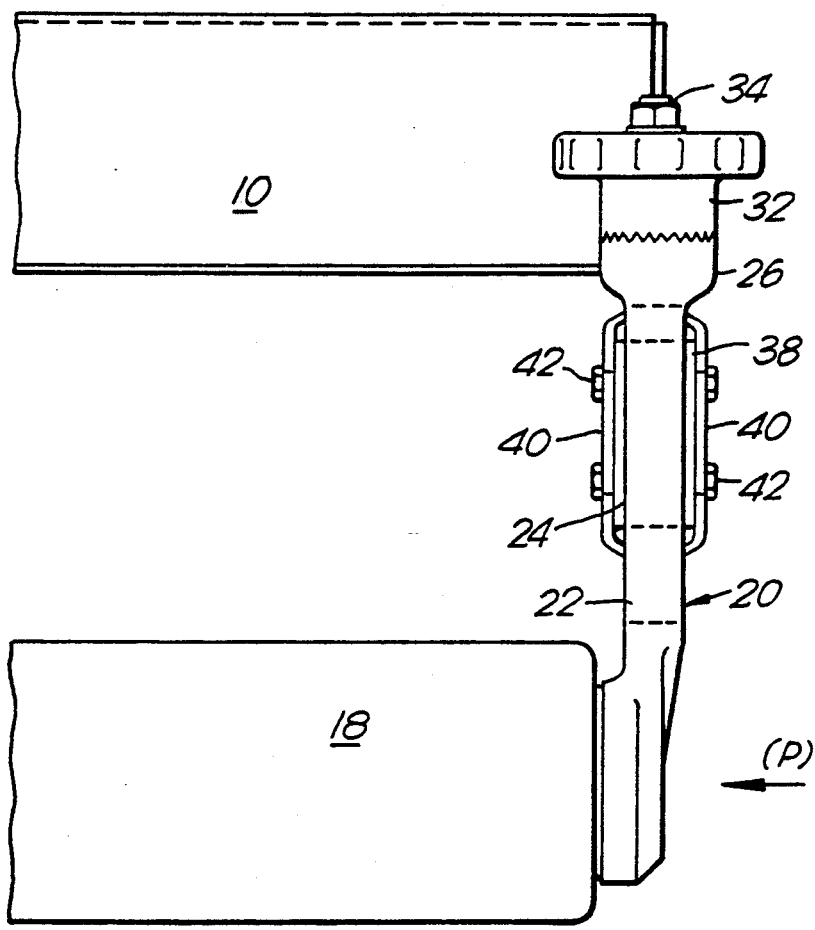
FIG. 2 is a rear view showing part of the unit of FIG. 1.
Figure 3:
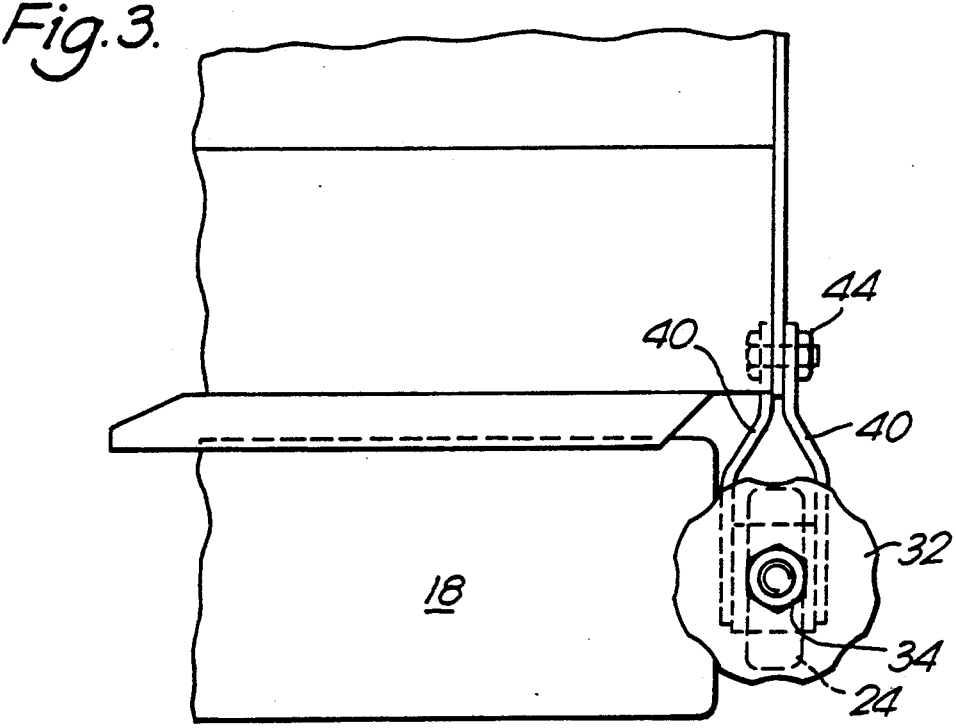
FIG. 3 is a top plan view showing part of the unit of FIG. 1.

Referring initially to FIGS. 1, 2 and 3, the described grass cutting unit has a frame shown generally at 10 providing a bed knife assembly 12 and bearings 14 for a cutting reel 16 shown in dotted outline. The cutting reel 16 and bed knife assembly 12 define a horizontal cutting line which is maintained at the desired vertical cutting height through the ground engagement of roll 18.

The ground roll 18 is rotatably supported at its ends in respective roll supports 20, only one of which is shown in the drawings. The necessary bearings can be located either in the roll supports 20 or within the roll 18 itself. In this way, the reaction R is transferred from the roll to the roll support 20. For convenience, the description that follows will be restricted to one roll support, it being understood that there is an identical arrangement provided at the other end of the roll.

The roll support 20 comprises a base part 22 from which integral forks 24 extend upwardly to an integral reaction member 26. A screw 28 has at its lower end a spigot 30 which is freely rotatable in the base member 22. The screw 28 extends between the forks 24 and passes with clearance through an aperture in the reaction member 26. A knurled hand wheel 32 is held on the screw 28 by nut 34 and is keyed for rotation with the screw 28 by key 36. The respective, opposing surfaces of the hand wheel 32 and the reaction member 26 are irregularly shaped so that rotation of the hand wheel 32 is inhibited whilst the hand wheel 32 and reaction member 26 remain in contact. The hand wheel can, however, be lifted relative to the reaction member 26 and the remainder of the roll support 20 with the spigot 30 being sufficiently long to remain in contact with the base member 22 during this movement. Once lifted, the handwheel 32 can be rotated.

A block 38 has a central bore which is threaded upon the screw 28, the block being positioned between the forks 24 of the roll support 20. As seen best in FIG. 2, the block 38 projects a short distance beyond the forks 24 in both transverse directions. Cranked mounting plates 40 are bolted at 42 to opposite transverse faces of the block 38 and extend forwardly for bolting at 44 to an upright member of the frame 10.

During normal cutting operations, the weight W of the cutting unit is carried through cranked mounting plates 40, block 38, screw 28, hand wheel 32 and roll support 20 to ground reaction R. Any tendency of the hand wheel 32 to rotate by engagement with the helical screw-thread as axially loaded by the ground reaction R, is restrained by the engagement between the described irregular abutment surfaces. These surfaces are maintained in close contact by the weight of the unit W which, as described, acts upon the hand wheel 32.

To maintain the irregular abutment surfaces in contact during transport or when the roll loses contact with the ground during cutting, a compression spring 50 is provided on the thread 28, acting between the underside of the reaction member 26 and a washer 52 fixed to screw 28.

The axial load P and the fore and aft horizontal loads H and Ha are taken through the engagement of block 38 on screw 28. In a modification, the block 38 could be shaped as a sliding fit within the forks 24 so that the loads P, H and Ha could be taken directly on the roll support 20 without imposing bending loads on the screw 28.

In the described cutting unit, a height of cut adjustment is provided which is simple to operate and in which a locking feature is provided with a minimum of additional components and with minimal space requirements. In fact, in the described arrangement, it can be seen that the adjusting mechanism occupies a volume lying above and within the extremities of the ground roll.

It will be recognised that the irregular abutting surfaces of the hand wheel 32 and reaction number 26 could take a wide variety of forms, it being merely necessary that the engagement of the surfaces, under the weight (or a substantial proportion of the weight) of the frame and the cutting reel, serves to inhibit rotation of the hand wheel. The surfaces could for example be castellated or short axial pins extending from one surface could engage within recesses in the other. Similarly, the skilled man will recognise that there are a variety of arrangements in which two adjustment members can be screw-threaded such that rotation of one with the respect to the other serves to alter the height of cut.

Referring now to FIG. 4, there is shown a modification by which the loading on the block 38 is considerably reduced. This modification will be appropriate for larger grass cutting machines that typically undergo more arduous and prolonged use. In this figure, those parts common to FIG. 1 retain the same reference numeral and will not be further described.

The crank mounting plates 40 are in the FIG. 4 embodiment not bolted to the block 38 but are pivotally mounted on trunnions 60. The roll support 20 is provided in the region of the base part 22 with a lug 62 providing a pivotal mounting at 64 for one end of a link 66. The other end of this link 66 is pivotally mounted at 68 in the frame 10. In this way, the link 66 takes a substantial proportion of the loading P, H and Ha.

In a still further modification, illustrated in FIG. 5, the link 66 is replaced by a cranked link member 70 which provides at 72 the rotatable bearing for the roll 18. An upper region of the link member 70 provides at 74 a pivotal mounting for the reshaped base part 22' of the roll support. The link member 70 is pivoted as in the FIG. 4 arrangement to the frame of the cutting unit. It will be recognised that this configuration functions in an analagous manner to that of FIG. 4.

Figure 6:
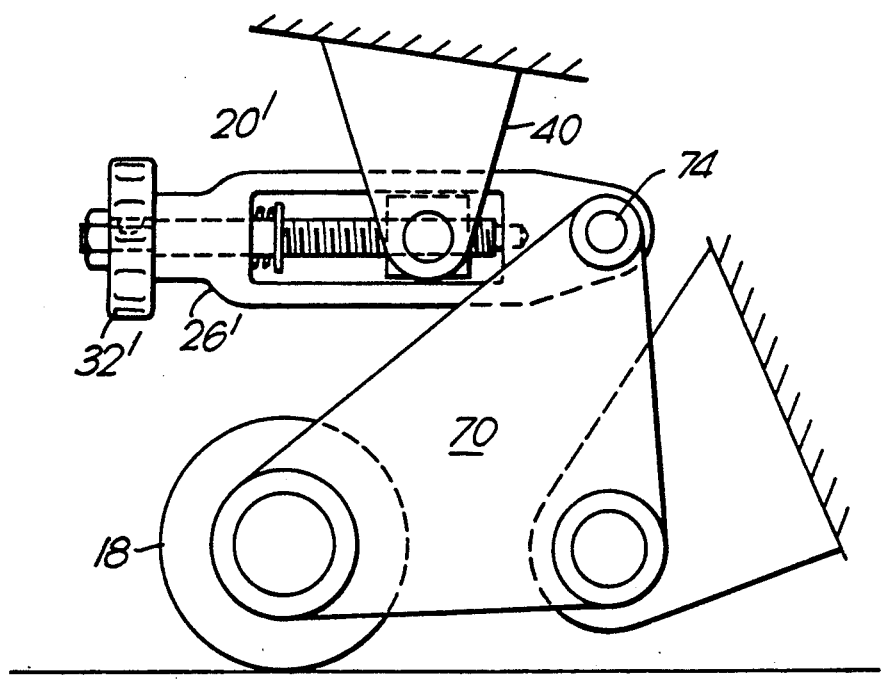

In yet a further modification, illustrated in FIG. 6, the roll support 20' (which is otherwise the same as that shown in FIG. 5) is disposed horizontally with a corresponding change in configuration of the cranked link member 70'. The procedure for adjusting the cutting height is analogous with that described above, save that the screw-thread axis is now horizontal rather than vertical. Still, a substantial proportion of the weight of the frame and cutting reel acts to force the hand wheel 32' into engagement with the reaction member 26', contact between the described contoured surfaces then inhibiting rotation of the hand wheel.

I claim:

1. A grass cutting unit comprising a frame; a cutting reel rotatably mounted in the frame to define therewith a horizontal cutting line; a ground roll and roll support means connected between the roll and the frame and serving, with the roll in ground engagement, to support the frame with the cutting line at a desired cutting height above ground, wherein the roll support means comprises first and second screw-thread inter-engaging adjustment members operatively connected with the ground roll and the frame respectively, such that relative rotation of said adjustment members about a screw-thread axis thereof serves to adjust the cutting height, characterised in that there is provided a reaction member having a surface adapted for interlocking engagement with a surface of the first adjustment member to inhibit said relative rotation of the adjustment members and in that, to permit said adjustment of the cutting height, the first adjustment member is moveable away from the reaction member against the action of at least a substantial proportion of the weight of the frame and the cutting reel.

2. A grass cutting unit according to claim 1, wherein the reaction member provides a mounting for the first adjustment member, the first adjustment member being rotatable with respect to the reaction member about the screw-thread axis and being slidable relative to the reaction member along the screw-thread axis to bring said interlocking surfaces into and out of engagement.

3. A grass cutting unit according to claim 2, wherein the first adjustment member comprises a screw-threaded shaft carrying a hand wheel.

4. A grass cutting unit according to claim 3, wherein said interlocking surfaces are provided respectively on the hand wheel and on an opposing portion of the reaction member.

5. A grass cutting unit according to any one of the preceding claims, wherein the second adjustment member is operatively connected with the frame and wherein the reaction member is operatively connected with the ground roll.

6. A grass cutting unit according to claim 5, wherein there is further provided a link pivotally connected between the reaction member and frame.

7. A grass cutting unit for pendant mounting on a grass cutting machine, the unit comprising a frame; a cutting reel rotatably mounted in the frame to define therewith a horizontal cutting line; a ground roll for supporting the frame with said cutting line at a desired cutting height above the ground; a reaction member connected with the ground roll and having a first contoured abutment surface; a first screw-thread adjustment member mounted in the reaction member for rotation about a screw-thread axis and for translational movement relative to the reaction member from a cutting position to an adjustment position, said adjustment member having a second contoured abutment surface engaging said first contoured abutment surface in the cutting position to inhibit said rotation of the first adjustment member; a second screw-thread adjustment member connected with the frame and engaged with the first screw-thread adjustment member such that said rotation of the first screw-thread adjustment member serves to adjust the position of the frame relative to the ground roll and thus said cutting height; the arrangement being such that at least a substantial proportion of the weight of the frame and the cutting reel acts to urge the first contoured abutment surface into engagement with the second contoured abutment surface.

8. A grass cutting unit according to claim 7, wherein the first screw-thread adjustment member carries a hand wheel fixed for rotation therewith, the first contoured abutment surface being formed on said hand wheel.

9. A grass cutting unit according to claim 7 or claim 8, wherein a link is pivotally connected between the reaction member and the frame.

10. A grass cutting unit according to claim 9, wherein the ground roll is carried on said link.

* * * * *